US009950836B2

(12) United States Patent
Jang et al.

(10) Patent No.: US 9,950,836 B2
(45) Date of Patent: Apr. 24, 2018

(54) COSMETIC PROTECTIVE FILM USING SURLYN RESIN, METHOD FOR MANUFACTURING SAME, AND COSMETIC CONTAINER MANUFACTURED USING SAME

(71) Applicant: AMOREPACIFIC CORPORATION, Seoul (KR)

(72) Inventors: Yongjae Jang, Seoul (KR); Joonyoung Kim, Seoul (KR); Kyounghee Jeon, Seoul (KR); Seonglyoung Kim, Seoul (KR)

(73) Assignee: AMOREPACIFIC CORPORATION, Yongsan-Gu, Seoul (KR)

( * ) Notice: Subject to any disclaimer, the term of this patent is extended or adjusted under 35 U.S.C. 154(b) by 534 days.

(21) Appl. No.: 14/410,046

(22) PCT Filed: May 29, 2013

(86) PCT No.: PCT/KR2013/004683
§ 371 (c)(1),
(2) Date: Dec. 19, 2014

(87) PCT Pub. No.: WO2013/191390
PCT Pub. Date: Dec. 27, 2013

(65) Prior Publication Data
US 2015/0197370 A1    Jul. 16, 2015

(30) Foreign Application Priority Data

Jun. 20, 2012  (KR) .................. 10-2012-0066054

(51) Int. Cl.
*A45D 34/00* (2006.01)
*B29C 45/14* (2006.01)
(Continued)

(52) U.S. Cl.
CPC ............. *B65D 23/02* (2013.01); *A45D 34/00* (2013.01); *A45D 40/00* (2013.01); *B32B 1/02* (2013.01);
(Continued)

(58) Field of Classification Search
CPC .............. B29C 45/14434; A45D 40/24; A45D 2034/007
(Continued)

(56) References Cited

U.S. PATENT DOCUMENTS 6,337,113 B1    1/2002  Muggli et al.
2002/0175136 A1*  11/2002  Bouix .................... A45D 33/18
215/12.2

FOREIGN PATENT DOCUMENTS

JP    2004-003191 A    1/2004
JP    2004-216773 A    8/2004
KR    20-0326063 Y1    9/2003

* cited by examiner

*Primary Examiner* — Ellen S Wood
(74) *Attorney, Agent, or Firm* — Lucem, PC; Heedong Chae

(57) ABSTRACT

The present invention relates to a cosmetic protective film using a Surlyn resin, and more particularly to a cosmetic protective film using a Surlyn resin which is produced by applying a Surlyn resin, is easily attached to a printing layer using a UV curing adhesive, and can perfectly protect cosmetics while increasing work efficiency by further applying a PE or PET material if necessary. A cosmetic protective film using a Surlyn resin, includes: a cosmetic container (100); and a protective film (200) attached to the cosmetic container. The protective film (200) includes: a base film layer (10) attached to a cosmetic container body; a printing layer (20) applied on the base film layer and on which various patterns and logos are printed; a UV curing adhesive layer (30) applied on the printing layer and cured by UV rays which are supplied to the UV curing adhesive layer; and a Surlyn resin layer (40) applied on the UV curing adhesive layer, for blocking external infrared rays or UV rays to prevent modification of a cosmetic solution.

10 Claims, 3 Drawing Sheets

(51) Int. Cl.
  *B65D 23/02* (2006.01)
  *B32B 7/12* (2006.01)
  *B32B 27/08* (2006.01)
  *A45D 40/00* (2006.01)
  *B32B 27/36* (2006.01)
  *B32B 1/02* (2006.01)
  *B32B 37/18* (2006.01)
  *B32B 37/12* (2006.01)
  *B32B 38/00* (2006.01)

(52) U.S. Cl.
  CPC ............... *B32B 7/12* (2013.01); *B32B 27/08* (2013.01); *B32B 27/36* (2013.01); *B32B 37/182* (2013.01); *A45D 2034/007* (2013.01); *B32B 37/1284* (2013.01); *B32B 38/0008* (2013.01); *B32B 38/145* (2013.01); *B32B 2037/1253* (2013.01); *B32B 2255/10* (2013.01); *B32B 2255/26* (2013.01); *B32B 2307/536* (2013.01); *B32B 2307/71* (2013.01); *B32B 2310/0831* (2013.01); *B32B 2439/00* (2013.01); *B32B 2439/60* (2013.01); *Y10T 428/1352* (2015.01)

(58) Field of Classification Search
  USPC .................. 428/34.1, 35.7; 215/12.2, 12.1
  See application file for complete search history.

COSMETIC PROTECTIVE FILM USING SURLYN RESIN, METHOD FOR MANUFACTURING SAME, AND COSMETIC CONTAINER MANUFACTURED USING SAME

TECHNICAL FIELD

The present invention relates to a cosmetic protective film using a Surlyn resin, and more particularly to a cosmetic protective film using a Surlyn resin which is produced by applying a Surlyn resin, is easily attached to a printing layer using a UV curing adhesive, and can perfectly protect cosmetics while increasing work efficiency by further applying a PE or PET material if necessary.

BACKGROUND ART

Protective films are attached to all products, such as various display products and general electronic appliances, including mobile phones, notebooks, and cosmetic cases, which are released from factories to protect the products. Such a protective film require a strength and a bonding property according to a product, and it is preferable that the protective film is formed of a transparent material so as not to damage an external appearance of the product in addition to an aspect of the product. It is preferable that an adhesive is not stuck to a product, that is, the adhesive is not transferred to the product after the protective film is removed.

In addition, in recent years, problems due to harmful substances emitted from various chemical products have been social issues, and development of environment-friendly materials which do not emit harmful substances is urgent in the field of product protective film.

According to the related art, PVC, PE, and PP films and acryl or a silicon resin are used as a product protective film. However, since a large amount of chlorine substances is detected from the PVC film, it appears that use of the PVC film will be limited. When a conventional acryl adhesive is used, an afterimage may be left on a surface and bubbles may be generated. Further, bonding force also may be problematic. General PP is transparent but is not flexible due to material characteristic thereof, and thus there is a limit in using general PP on convexo-concave surfaces or curved surfaces.

Further, various functional cosmetics having various functions, such as a skin whitening function, a skin wrinkle prevention function, and a hair follicle reduction function, have recently released. Because the functional cosmetics are not chemically stable against heat or light, cosmetic contents cannot be smoothly protected so that the cosmetic contents may be modified if PVC, PE, PP films, acryl or a silicon resin is used as an adhesive.

That is, if functional cosmetics is preserved while a suitable protective film is not applied to a surface of the functional cosmetics, cosmetic contents may be modified so that effectiveness deteriorates, and as the modified contents are converted into a functional material having a strong stimulus, a skin trouble may be caused.

DISCLOSURE

Technical Problem

Accordingly, the present invention has been made in an effort to solve the above-described problems, and an objective of the present invention is to maximize a bonding efficiency of a Surlyn resin by applying the Surlyn resin as a cosmetic film, attaching the Surlyn resin using a UV curing adhesive, and adding PE or PET between the UV curing adhesive and the Surlyn resin.

Technical Solution

In accordance with an aspect of the present invention, there is provided a cosmetic protective film using a Surlyn resin, including: a cosmetic container (100); and a protective film (200) attached to the cosmetic container, wherein the protective film (200) includes: a base film layer (10) attached to a cosmetic container body; a printing layer (20) applied on the base film layer and on which various patterns and logos are printed; a UV curing adhesive layer (30) applied on the printing layer and cured by UV rays which are supplied to the UV curing adhesive layer; and a Surlyn resin layer (40) applied on the UV curing adhesive layer, for blocking external infrared rays or UV rays to prevent modification of a cosmetic solution.

The base film layer (10) includes 60 wt % to 80 wt % of homo polypropylene, 10 wt % to 50 wt % of a copolymer of ethylene and propylene, and 0.1 wt % to 5 wt % of polyethylene.

The Surlyn resin layer (40) is used alone, a PE layer or a PET layer is selectively coupled to a lower end of the Surlyn resin or the PE layer and the PET layer are sequentially coupled to the Surlyn resin if necessary.

The thickness of the Surlyn resin (41) is 15 μm to 20 μm.
The thickness of the PE layer (42) is 20 μm to 30 μm.
The thickness of the PET layer (43) is 20 μm to 25 μm.

In accordance with another aspect of the present invention, there is provided a cosmetic container formed by laminating a cosmetic protective film.

In accordance with another aspect of the present invention, a method for manufacturing a cosmetic protective film using a Surlyn resin, the method including: a step (S10) of preparing a base film layer (10) attached to a cosmetic container body; a step (S20) of applying a printing layer (20) applied on the base film layer and on which various patterns or logos are printed; a step (S30) of applying a UV curing adhesive layer (30) on the printing layer; a step (S40) of applying a Surlyn resin layer 40 on the curing adhesive layer; a step (S50) of curing the UV curing adhesive layer by irradiating UV rays to bond the Surlyin resin layer and the printing layer.

In accordance with another aspect of the present invention, a cosmetic container formed by laminating a film manufactured by the method of claim 8 on a cosmetic container body.

Advantageous Effects

As described above, according to the present invention, a bonding efficiency of a Surlyn resin can be maximized by applying the Surlyn resin as a cosmetic film, attaching the Surlyn resin using a UV curing adhesive to maximize protection of cosmetic contents, and adding PE or PET between an UV curing adhesive and a Surlyn resin if necessary.

BEST MODE

Mode for Invention

Figure 1:
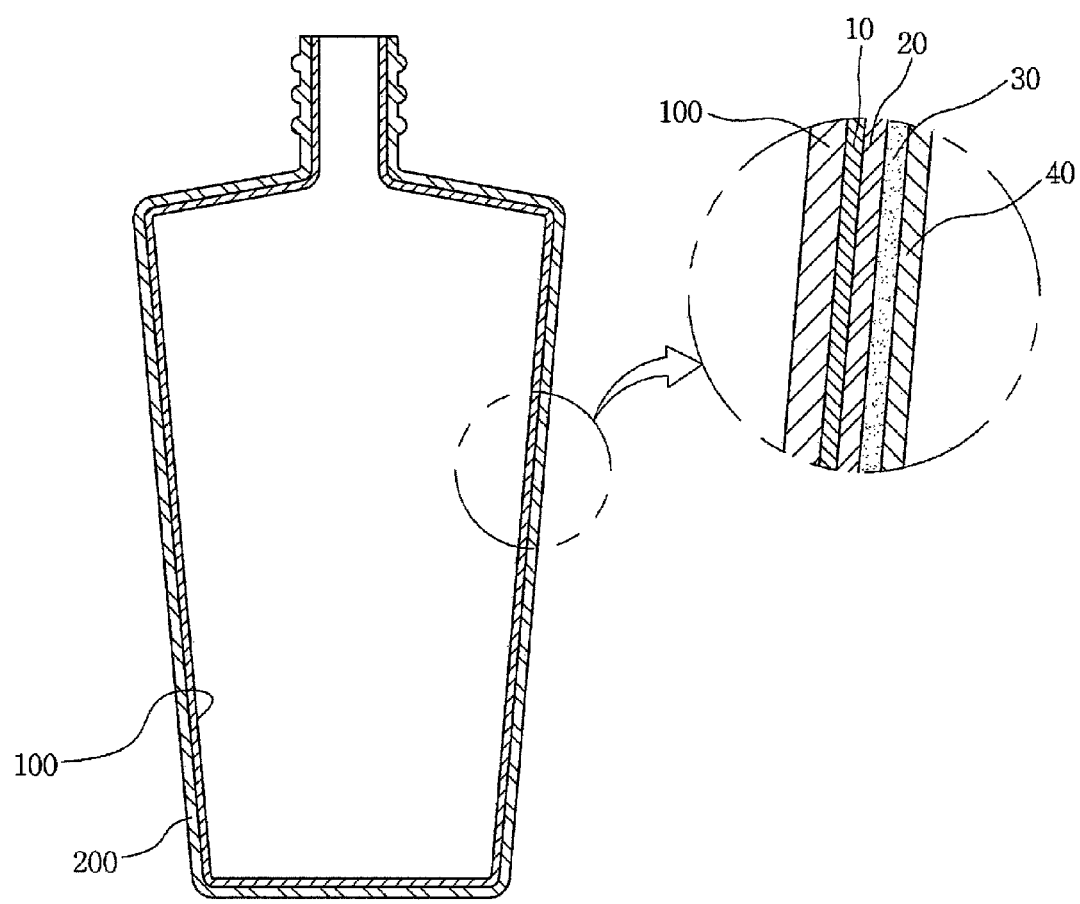
FIG. 1 is a diagram of a cosmetic container applied to the present invention.

Hereinafter, an exemplary embodiment of the present invention will be described with reference to the accompanying drawings. In providing reference numerals to the constituent elements of the drawings, the same elements may have the same reference numerals even if they are displayed on different drawings. Further, in the following description of the present invention, a detailed description of known functions and configurations incorporated herein will be omitted when it may make the subject matter of the present invention rather unclear.

Since the following terms are set in consideration of the functions thereof in the present invention and thus may be different according to intentions or customs of manufacturers, the definitions of the terms should be made based on the overall contents of the specification.

FIG. 1 is a diagram of a cosmetic container applied to the present invention.

Figure 2:
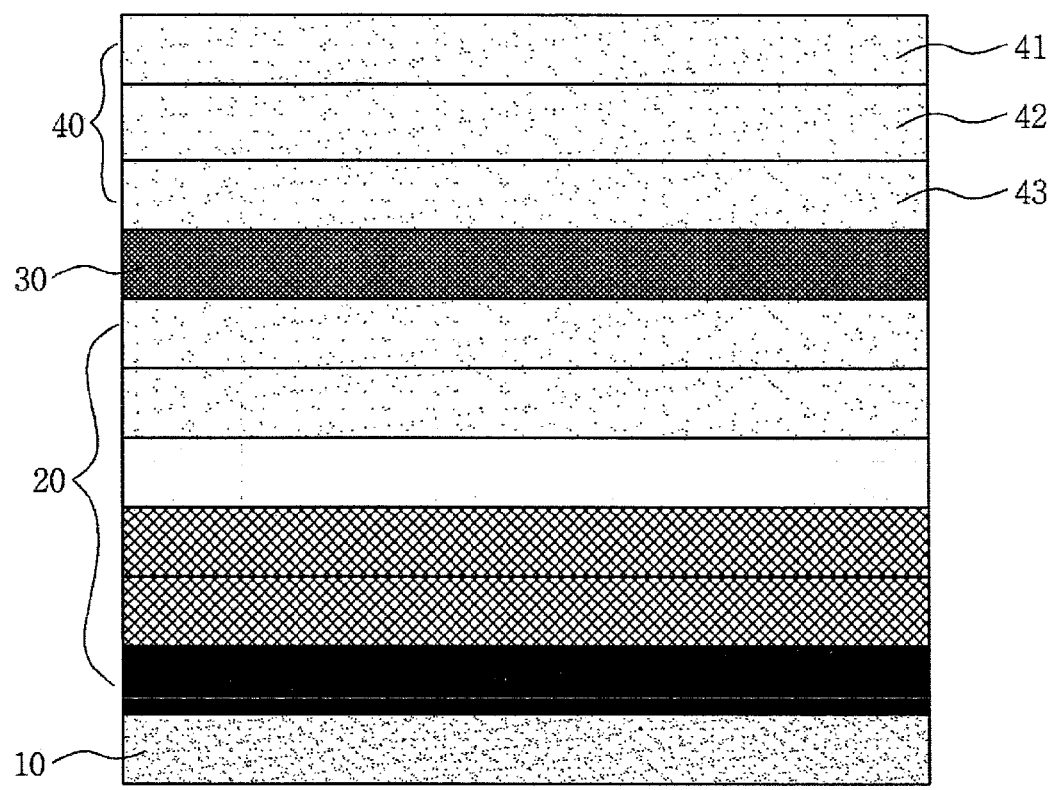
FIG. 2 is a sectional view of a cosmetic protective film using a Surlyn resin applied to the present invention.

FIG. 2 is a sectional view of a cosmetic protective film using a Surlyn resin applied to the present invention.

Figure 3:
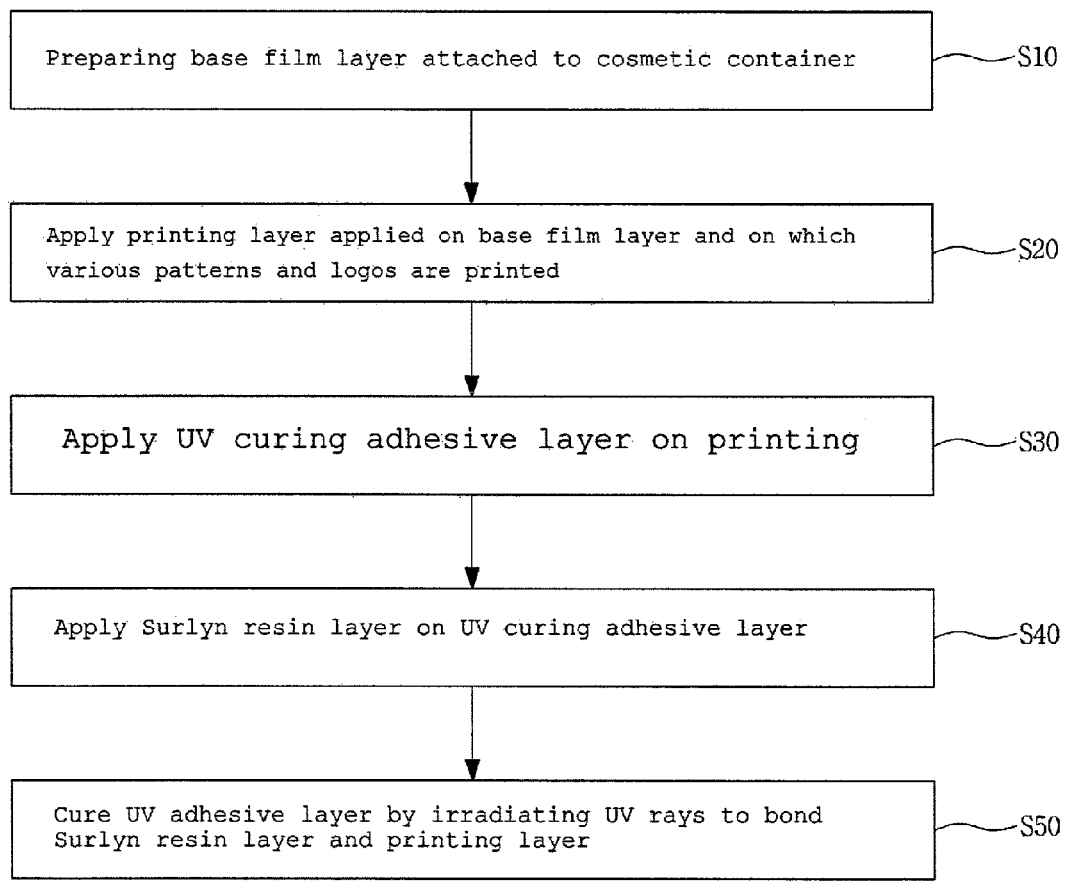
FIG. 3 is a flowchart illustrating a manufacturing method according to the present invention.

FIG. 3 is a flowchart illustrating a manufacturing method according to the present invention.

The present invention relates to a cosmetic protective film 200 attached to an outside of a body of a cosmetic container 100, and includes a base film 10, a printed film 20, a UV curing adhesive film 30, and a Surlyn resin layer 40.

The base film 10 is a film in which polypropylene and polyethylene are mixed. It is preferable that the polypropylene is high strength polypropylene. The polypropylene substance is obtained by mixing homo polypropylene obtained by polymerizing a propylene monomer and a copolymer obtained by copolymerizing propylene and ethylene.

Preferably, the polypropylene includes 60 wt % to 80 wt % of homo polypropylene, 10 wt % to 50 wt % of a copolymer of ethylene and propylene, and 0.1 wt % to 5 wt % of polyethylene. When polypropylene and polyethylene are mixed at the ratio, they can achieve a property suitable for a product protective film in aspects of heat resistance, strength, elongation percentage, and durability.

The printing layer 20 may have a plurality of applied layers, and is applied on the base film. The printing layer 20 is a layer showing a brand or a logo by silk-printing or pad-printing ink on the base film.

Then, the ink includes a polyurethane resin, isoamyl alcohol, a glycol derivative organic solvent, methyl isobutyl ketone, and a pigment, and it is preferable that their weight percentages are 1:0.5 to 0.8:0.1 to 0.4:0.2 to 0.4:0.1 to 0.2. In particular, methyl isobutyl ketone activates the polyurethane resin to realize an engraving pattern of a letter printing layer and improve a cubic effect. Methyl Salicylate may be added, and it is preferable that the weight percentages of methyl isobutyl ketone and methyl Salicylate is 1:0.5 to 1.

In addition, a primer may be formed on a lower surface of a letter printing layer in order to further improve a bonding force between the base film and the letter printing layer if necessary, and the primer includes an epoxy-polyester mixed polymer, poly-Esocyanate, an organic solvent, and carbon black, and it is preferable that their weight percentages are 1:1 to 0.3:0.7 to 1.1:0.1 to 0.2. Then, the value range of poly-Esocyanate is determined in consideration of hardness, bonding force with a letter printing layer, and solvent resistance, and sinc hardness is low when the weight percentage is equal to or less than 0.1, corrosion resistance and solvent resistance are lowered, and if the weight percentage exceeds 0.3, processing efficiency and bonding property deteriorate.

The UV curing adhesive layer 30 comes to have bonding performance while a resin reacts with UV rays by applying a UV curing rain and projecting UV rays, and the UV curing resin is one selected from a Urethane Acrylate resin, an epoxy resin, an ester resin, and an acryl resin. The method of supplying the UV curing resin is performed through screen printing, application, or diffusion, and the screen printing may include flexographic printing or offset printing. The flexographic printing is a type of concave plate printing, and uses a flexible resin or a rubber plate. The flexographic printing may be performed at a low pressure. The offset printing pertains to flat plate printing, and is an indirect printing method in which transfer printing is performed on a rubber blanket with printing is not directly performed on a printing target object.

For reference, a product of a company such as THREEBOND, LOCTITE, or 3M is generally used as a UV curing adhesive.

That is, the UV curing resin is a curing resin which generally uses light energy. The main substance of the UV curing resin is a polymer having an unsaturated group (a dual bonding group), an oligomer, a monomer, and a light initiator activated through irradiation of UV rays, and a radical polymerization is performed as a radical that generates a light initiator activates a resin containing an unsaturated group such that polymerization and coating may be realized. A free radical is generated by cutting a covalent bond in a radical reaction, which refers to a reaction performed through re-bonding. Various reactions such as separation, transition, and polymerization are performed through the free radical.

Since the UV curing resin is cured and coated in several seconds after irradiation of UV rays, production efficiency is excellent, equipment can be finished with a high quality, and curing is performed at a low temperature, so that it is suitable for an outer film of a cosmetic container because curing does not require heat of high temperature. Since the UV curing resin may be of one liquid type, it can be simply treated, is suitable for painting of a material that is not suitable for heating, and does not consume much energy for curing as compared with a thermosetting paint. Since the UV curing resin includes a monomer having a relatively low molecular weight, much solvent is not used and is mostly a non-solvent type pigment, nearly 100 wt % of the UV curing resin is a coating substance. Therefore, as the UV resin curing resin is environment-friendly and processing time is shortened, productivity can be remarkably improved and a coating film with excellent solvent resistance, contamination resistance, chemical resistance, and wear resistance can be obtained.

The Surlyn resin layer 40 is coated on the UV curing adhesive layer 30. The Surlyn resin 41 may be used alone, and a PE layer 42 or a PET layer 43 may be selectively added if necessary or the PE layer 42 and the PET layer 43 may be sequentially added to the Surlyn resin if necessary.

The Surlyn resin 41 applied to the present invention is manufactured by Dupont Inc. The Surlyn resin 41 is flexible at a low temperature and is easily bonded to a metal, nylon, polyolefin, epoxy, and a urethane final product. The Surlyn is widely used in baked products, processed meat, and frozen food packing, and is known to be widely used in leather products for furniture, vinyl tapes, vehicular seats, pads, anti-freezing interior materials of windows, insulation of wires, cable jackets, and shoes.

In particular, when the Surlyn resin 41 is applied to a cosmetic container, it blocks external infrared rays and ultraviolet rays to completely prevent cosmetic contents from being modified. In the present invention, the Surlyn resin 41 is applied to have a thickness of 15 μm to 20 μm.

The PE layer 41 is applied to have a thickness of 20 μm to 30 μm, and the PET layer 42 is applied to have a thickness of 20 μm to 25 μm.

According to the present invention, the Surlyn resin layer 40 is applied, in particular, is applied to the printing layer 20 using the UV curing adhesive, and accordingly, the Surlyn resin 41 is easily bonded so that a film attached to an outside of the cosmetic container can be easily manufactured and modification of the cosmetic contents can be completely prevented.

If all layers are applied, UV rays are irradiated by using a UV lamp, and coating is cured by using UV irradiation energy. A process of completely bonding the printing layer and the resin layer is a process of drying the layers by applying irradiation energy of 1000 mj/cm2 having an absorption wavelength of 360 nm.

Then, if irradiation energy is lower than 100 mj/cm2, UV curing is not performed and coating and a coated object are not bonded to each other, and if irradiation energy is higher than 1000 mj/cm2, over curing is generated and brittleness may be caused so that a change in property may be caused, so that irradiation energy of 100 mj/cm2 is applied.

Hereinafter, a process of manufacturing a cosmetic protective film using a Surlyn resin according to the present invention will be described below.

The manufacturing process includes:

a step (S10) of preparing a base film layer 10 attached to a cosmetic container body;

a step (S20) of applying a printing layer 20 applied on the base film layer and on which various patterns or logos are printed;

a step (S30) of applying a UV curing adhesive layer 30 on the printing layer;

a step (S40) of applying a Surlyn resin layer 40 on the curing adhesive layer;

a step (s50) of curing the UV curing adhesive layer by irradiating UV rays to bond the Surlyin resin layer and the printing layer.

The present invention can attach the cosmetic protective film to the cosmetic container body to manufacture cosmetics, and the cosmetic protective film can be attached to the cosmetic container body using injection-molding after the cosmetic container body and the cosmetic protective film are inserted into an insert mold.

Description of Reference Numerals

10: base film
20: Printing layer
20: UV curing adhesive layer
40: Surlyn resin layer
41: Surlyn resin
42: PE layer
43: PET layer

The invention claimed is:

1. A cosmetic protective film using a Surlyn resin, comprising:
   a cosmetic container (100); and
   a protective film (200) attached to the cosmetic container, wherein the protective film (200) comprises:
   a base film layer (10) attached to a cosmetic container body;
   a printing layer (20) applied on the base film layer and on which various patterns and logos are printed;
   a UV curing adhesive layer (30) applied on the printing layer and cured by UV rays which are supplied to the UV curing adhesive layer; and
   a Surlyn resin layer (40) applied on the UV curing adhesive layer, for blocking external infrared rays or UV rays to prevent modification of a cosmetic solution,
   wherein the base film layer (10) comprises 60 wt % to 80 wt % of homo polypropylene, 10 wt % to 50 wt % of a copolymer of ethylene and propylene, and 0.1 wt % to 5 wt % of polyethylene.

2. The cosmetic protective film of claim 1, wherein the Surlyn resin layer (40) is used alone, a PE layer or a PET layer is selectively coupled to a lower end of the Surlyn resin or the PE layer and the PET layer are sequentially coupled to the Surlyn resin if necessary.

3. The cosmetic protective film of claim 1, wherein the thickness of a Surlyn resin (41) is 15 μm to 20 μm.

4. The cosmetic protective film of claim 2, wherein the thickness of the PE layer (42) is 20 μm to 30 82 m.

5. The cosmetic protective film of claim 2, wherein the thickness of the PET layer (43) is 20 μm to 25 μm.

6. A cosmetic container formed by laminating a cosmetic protective film of claim 5.

7. A cosmetic container formed by laminating a cosmetic protective film of claim 4.

8. A cosmetic container formed by laminating a cosmetic protective film of claim 3.

9. A cosmetic container formed by laminating a cosmetic protectvive film of claim 2.

10. A cosmetic container formed by laminating a cosmetic protective film of claim 1.

* * * * *